United States Patent
Rostampour

(10) Patent No.: US 8,407,396 B2
(45) Date of Patent: Mar. 26, 2013

(54) PROVIDING BLOCK DATA ACCESS FOR AN OPERATING SYSTEM USING SOLID-STATE MEMORY

(75) Inventor: Arad Rostampour, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1556 days.

(21) Appl. No.: 10/903,986

(22) Filed: Jul. 30, 2004

(65) Prior Publication Data

US 2006/0026339 A1 Feb. 2, 2006

(51) Int. Cl.
 *G06F 12/00* (2006.01)
 *G06F 13/00* (2006.01)
 *G06F 13/28* (2006.01)
 *G11C 11/34* (2006.01)
 *G11C 16/04* (2006.01)

(52) U.S. Cl. ........ 711/103; 711/100; 711/115; 711/170; 711/171; 711/172; 711/173; 365/185.33

(58) Field of Classification Search .................. 711/103, 711/100, 170–173
See application file for complete search history.

(56) References Cited

U.S. PATENT DOCUMENTS

| | | | | |
|---|---|---|---|---|
| 5,404,485 | A | * | 4/1995 | Ban .............................. 711/202 |
| 5,590,228 | A | * | 12/1996 | Gibola et al. ................... 385/56 |
| 5,630,093 | A | * | 5/1997 | Holzhammer et al. ....... 711/115 |
| 6,889,340 | B1 | * | 5/2005 | Bramley, Jr. ...................... 714/6 |
| 2003/0195737 | A1 | * | 10/2003 | Shapiro et al. ................. 703/24 |
| 2004/0230573 | A1 | * | 11/2004 | Rhoads et al. .................... 707/3 |
| 2006/0242359 | A1 | * | 10/2006 | Bancsi .......................... 711/113 |

OTHER PUBLICATIONS http://en.wikipedia.org/wiki/Optical_disc.*
Extensible Firmware Interface Specification, Version 1.10, Dec. 1, 2002, intel.

* cited by examiner

*Primary Examiner* — Yaima Campos

(57) ABSTRACT

Block data access is provided for an operating system by allocating a portion of solid-state memory of a data processing arrangement for use as a block storage device. A block device interface is created that provides access to the portion of solid-state memory via firmware of the data processing arrangement. The block device interface emulates an electromechanical data-storage device. The block device interface is presented to the operating system at a boot-time of the operating system and the block device interface is accessed using a block device driver of the operating system during the boot-time of the operating system. The block device driver emulates the electromechanical data-storage device to the operating system.

20 Claims, 3 Drawing Sheets

PROVIDING BLOCK DATA ACCESS FOR AN OPERATING SYSTEM USING SOLID-STATE MEMORY

FIELD OF THE INVENTION

The present disclosure relates to data processing, and in particular to providing block data access for an operating system using solid-state memory.

BACKGROUND

Modern personal computers (PC) have been the beneficiary of much technological innovation over the past decades. Performance gains have been achieved by increasing processor speed, as well as increasing data transfer speed over input-output (I/O) busses. The progress in I/O speeds has largely come about through the implementation of new interface standards, although backwards compatibility has required that many legacy interfaces still be included on PCs.

In the x86 processor world, the original standard I/O interfaces include serial and parallel ports for external peripherals, the Industry Standard Architecture (ISA) bus for plug-in cards, and the Integrated Drive Electronics (IDE) interface for floppy disk and hard drives. Modern PCs may contain some of these interfaces, but there has been a steady transition to Universal Serial Bus (USB) and IEEE 1394 for peripherals, Peripheral Component Interconnect (PCI) bus for cards, and Enhanced IDE and AT Attachment (ATA) hard drives. Other specialized interfaces have been developed for various hardware and environments, such as Personal Computer Memory Card International Association (PCMCIA) devices for portable computers and Advanced Graphic Processor (AGP) bus interfaces for video cards.

With all of the advances in computer I/O standard, the underlying mechanics utilized by an operating system at boot-time to access these I/O devices has not changed that significantly. For example, x86 based PCs utilize a basic input/output system (BIOS) for startup functions such as self-test and providing a basic set of instructions used to boot the computer. On most current computer motherboards, the BIOS is stored in an Electrically Erasable Programmable Read-Only Memory (EEPROM,) also known as a "Flash" BIOS. Use of an EEPROM allows users to upgrade the BIOS when updates are made available.

The use of the BIOS has allowed a wide array of products to be usable at boot time by an operating system. The BIOS provides a standard layer of services that the operating system can use to "talk" to the hardware. The design of the BIOS has continually required modification due to some inherent limitations. For example, the addressing space that was defined for the system BIOS in earlier PC systems limited access to drives with a capacity of greater than 8.4 GB (7.9 GB on some systems.). These system BIOS of that era did not have adequate address locations to access more than 8.4 GB.

Although solutions were found for these problems, the "PC-AT" boot environment presents challenges to innovation in the computer industry. Advances in platform capabilities require hardware developers to adopt complex work-arounds, and require OS developers to make substantial changes to boot code. In response to this, the Extensible Firmware Interface (EFI) Specification was developed. The EFI defines an interface between the computer firmware and the operating system (OS). The EFI provides standard boot and run-time services to the OS that allows for platform innovation without requiring new boot-code be written for the OS.

Although EFI will provide an evolutionary path away from the legacy "PC-AT" boot environment, it will be appreciated that many currently used operating systems are still optimally configured to access lowest-common-denominator devices, most notably removable storage devices (e.g., floppy drives and CD-ROM). These devices may or may not be present at boot or run-time, but it is a safe assumption that an OS will have the capability to interact with these devices if they are present at boot time.

SUMMARY

Block data access is provided for an operating system by allocating a portion of solid-state memory of a data processing arrangement for use as a block storage device. A block device interface is created that provides access to the portion of solid-state memory via firmware of the data processing arrangement. The block device interface emulates an electromechanical data-storage device. The block device interface is presented to the operating system at a boot-time of the operating system and the block device interface is accessed using a block device driver of the operating system during the boot-time of the operating system. The block device driver emulates the electromechanical data-storage device to the operating system.

DETAILED DESCRIPTION

Figure 1:
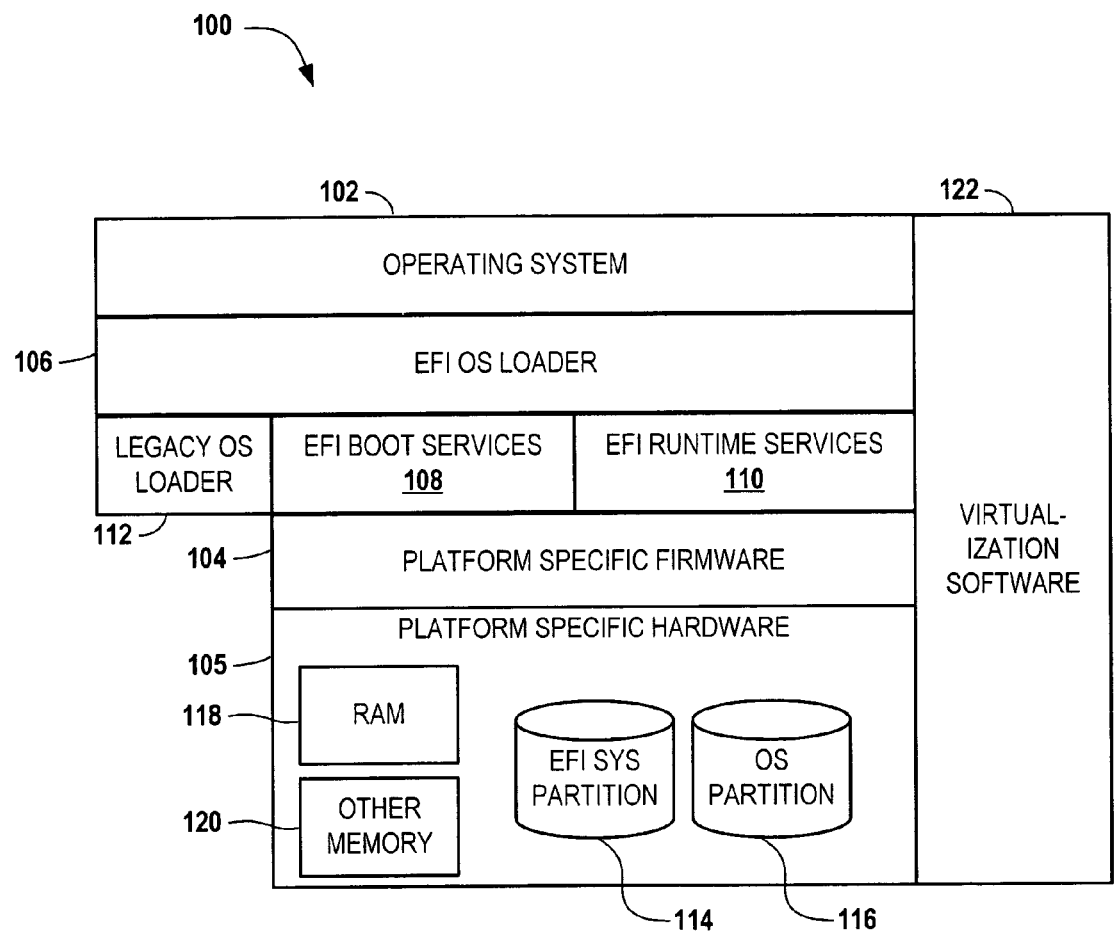
FIG. 1 illustrates a software architecture configured for providing a virtual block storage device according to embodiments of the present invention.

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

In general, the present disclosure relates to emulating a block device in solid-state memory. The block device that emulated is typically a removable electromechanical storage device such as a floppy drive, CD-ROM/R/RW, DVD, hard drive, Zip disk, although other removable or non-removable storage may be also emulated. The memory may be static or dynamic random access memory (RAM), read-only memory (ROM), flash memory, static RAM, programmable ROM (PROM), EPROM, or any other solid-state memory known in the art, as well as future memory products such as optical or quantum memory.

For some time it has been possible to create a virtual storage device using system RAM. These storage devices, often called "RAM disks," are often implemented using special drivers contained in the operating systems. For example, in Linux®-based operating systems, RAM disk support may be compiled into the kernel or inserted as a kernel module.

Other technologies besides RAM disks are used to make solid-state memory appear as a block device (e.g., hard drive) to an OS. For example, some products known as flash disks include non-volatile solid-state memory (e.g., NVRAM) coupled to standard I/O interfaces such as PCI and USB. These memory devices include hard drive interface circuitry to appear to the OS as a block device.

It will be appreciated that RAM and flash disks may be utilized in a wide variety of operating systems, including variations of Unix®, Linux®, and Windows® operating systems. These operating systems include features for presenting an interface to applications that makes it appear that the RAM or flash disk is a drive medium with a filesystem. However, at the device level, the data transfers are reading and writing to RAM instead of to sectors, cylinders, and other disk drive data structures. Because of this, a RAM or flash disk cannot be used as a boot device without a special modification to the boot code that allows the OS to utilize a RAM disk.

For example, the Microsoft® Windows® Server 2003 operating system requires the loading of drivers needed for booting. These drivers must already be on an installation CD, be on an available floppy disk, or use a specifically defined RAM disk (e.g., via flash memory accessed via a USB port, etc.). A RAM disk defined in such a way would likely be particular to a dedicated hardware and software configuration, and therefore would be of limited general value. However, if the RAM disk were set up in such a way as to be presented as a physical floppy drive to the OS, then the existing software would work without any additional knowledge of the implementation of the RAM disk.

Another example booting scenario relates to an OS configuration known as Windows PE. Windows PE is a small version of Windows that can be run from CD. Windows PE is not available to the public, but is a system builder tool furnished to Original Equipment Manufacturers (OEMs). A Windows PE CD may include Windows XP Home, XP Pro, or Server 2003. Windows PE supports booting off a local physical storage device or over the network by using an OS supported RAM disk specified by the Windows environment. In the absence of this special RAM disk and driver, there is no other supported way to run Windows PE.

Windows PE can interact with a CD device when in 64-bit mode when attempting a local install. One way of emulating this for a network install is to pull the contents of the CD over the network and place the contents in RAM, and then virtualize the RAM as a physical CD device. A conventional RAM disk approach could be used for such an implementation, but this would require a bootable RAM disk, which is not currently supported in the OS. Rather than requiring the OS support a conventional RAM disk, a RAM disk can be represented as a CD by utilizing firmware and particular OS disk access drivers.

In another example, many versions of Windows include setup programs distributed on a CD. The software included in the setup CD assumes it is running on a standard CD-ROM device. If the software was merely copied to a standard RAM device (e.g., a USB flash disk) and run from there, the setup would fail if it could not read the necessary files from a CD-ROM device via the computer firmware and OS drivers. However, if the RAM device was presented as a CD-ROM via the firmware and appropriate OS drivers, then the software copied to the RAM device could be used as if it were a physical disk without any alteration.

It will be appreciated that many different operating systems can benefit by utilizing a RAM disk abstracted as a physical disk via the firmware and an OS add-on driver. In general, the physical disk interfaces are a lowest-common denominator that is both familiar and reliable. Solid-state memory is becoming increasing cheaper, and offers many advantages over physical disks, including reduced size, durability, power consumption, speed, etc.

In reference now to FIG. 1, a computing architecture 100 is shown utilizing a RAM disk accessible as a virtual physical disk. The computing architecture 100 in this example utilizes the Extensible Firmware Interface (EFI) specification for interfacing between an operating system (OS) 102 and platform specific firmware 104. The EFI layer provides a generic and extensible interface for the OS to control system hardware 105 via the platform specific firmware 104.

The EFI layer includes an OS loader 106, EFI boot services 108, and EFI run-time services 110. The EFI boot services 108 abstract devices into device "handles" and "protocols" for use during boot time. This abstraction allows a legacy OS loader 112 (e.g., legacy BIOS code) to be reused without the end-user of the device having to worry about the underlying implementation. The EFI run-time services 110 also provide an abstraction of underlying hardware resources for use by the OS 102 during run-time.

The OS loader 106 is a piece of software that provides a generic interface to the OS 102 of all boot-time and run-time services. The platform firmware 104 may be used to retrieve the image of the OS loader 106 from an EFI system partition 114. The EFI system partition 114 provides a protected filesystem that allow vendors to include pre-boot and boot-time software without requiring additional nonvolatile solid-state memory on the system. The EFI system partition 114 may also include various drivers that provide access to boot devices and protocols.

The OS 102 may also access its own partition 116 for loading OS-specific data (e.g., kernel, drivers, programs, etc.). This data may be placed into system RAM 118 for use by the OS 102 at run-time. The OS 102 may access other devices during boot-time, including video cards, input/output (I/O) controllers, I/O devices (e.g., keyboards), network interfaces, etc. The OS 102 may also interact with other memory devices 120, which may include read-only memory (ROM) or non-volatile RAM (NVRAM).

It will be appreciated that, if the OS 102 needs to set up a RAM disk during boot-time, the OS 102 will allocate a portion of RAM 118 and prepare a driver to handle data transfers with the RAM disk. However, in order for a vendor to utilize an OS-specific RAM disk for use during boot time, there should be a pre-arranged and well-known mechanism built into the OS 102 to accomplish this. For the OS 102 to create the RAM disk, the OS 102 allocates a particular area of RAM 118 and prepares it for access as a disk device. Then, a boot program provided by the vendor can transfer data to the RAM disk for use by the OS 102 during the boot procedure. Such an arrangement would require close coupling between the OS 102 and the vendor, and may entail other complications, such as what portion of RAM 118 would be used for the RAM disk on a given system.

A much more flexible approach in providing a RAM disk is to create a RAM disk using firmware and present the RAM disk to the OS 102 as a virtual block. The architecture 100 may include virtualization software 122 for creating the RAM disk and presenting this RAM disk to the OS 102 as a generic block device (e.g., a floppy drive or CD-ROM) using a virtual block-device interface. Most operating systems have provisions for accessing certain block devices during boot. This is also true during setups and installs of the OS 102, where the install procedure may include reading from a block device to obtain new or updated drivers. Therefore, the virtualization software 122 could create a virtual block device, place the current drivers on that device, and the OS 102 could access those drivers during the first install, and/or during subsequent reboots. As used herein, the term "virtual block device" refers to an emulated physical device in RAM that the OS can discover without having special code to discover a RAM disk interface. The "virtual block device" includes both firmware extensions and add-on OS drivers that may be used to access the virtual block device via the OS.

The virtualization software 122 may be implemented using any combination of hardware and software components of the architecture 100. In the illustrated example, the software 122 is provided as part of the EFI boot services 108 and/or run-time services 110. However, the functionality of the virtualization software 122 may also be implemented in hardware 104, or be provided as part of a legacy BIOS loader 112.

Figure 2:
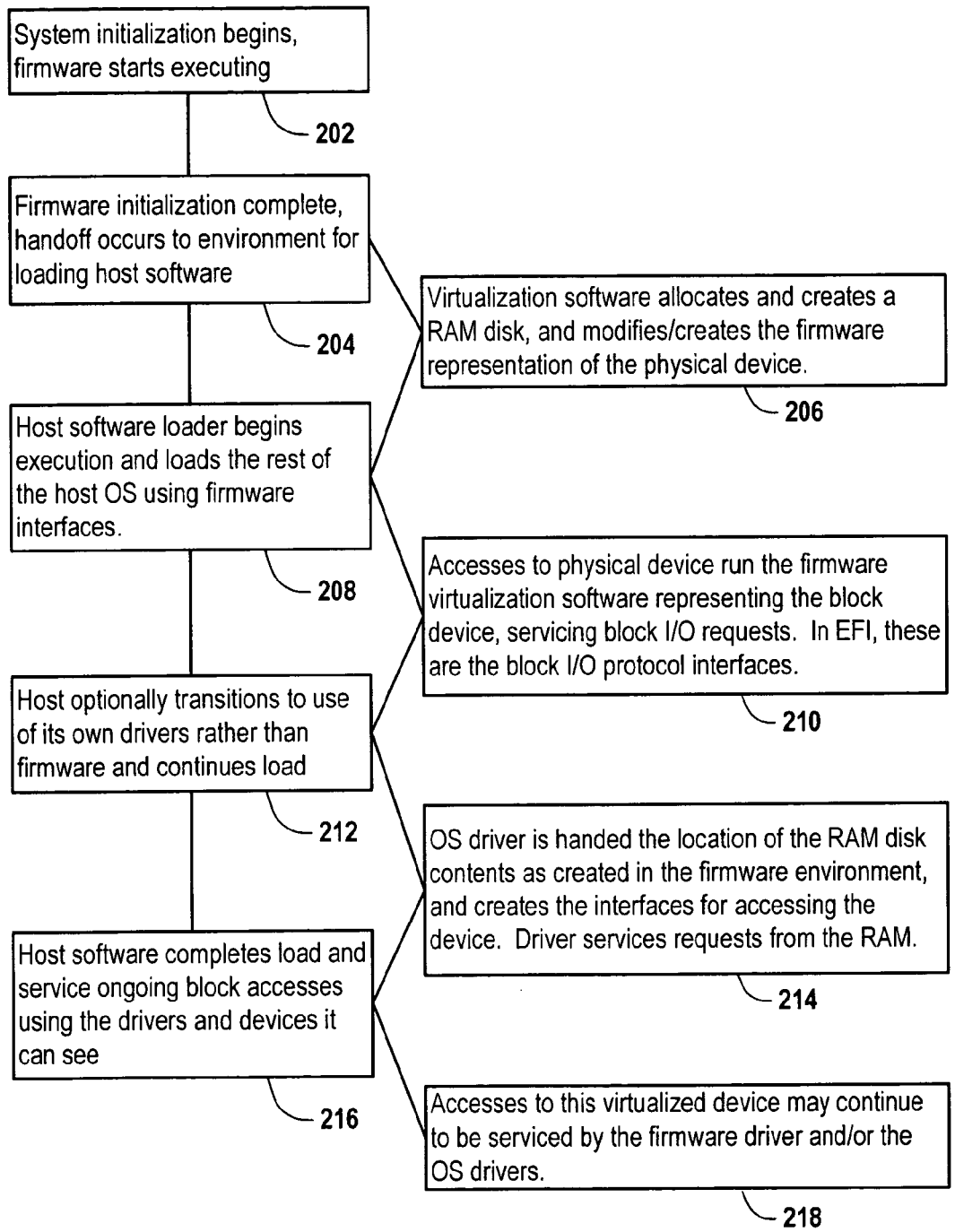
FIG. 2 illustrates a procedure for providing a virtual block storage device to an operating system during boot-time and run-time according to embodiments of the present invention.

Turning now to FIG. 2, an example procedure is illustrated for providing block data storage in RAM for an OS at boot-time in accordance with embodiments of the present invention. The procedure starts with system initialization (202), which typically involves the processor starting up and accessing and executing firmware instructions from a known memory location. Once the firmware initialization (202) is complete, a handoff (204) occurs to the system environment in preparation for the OS to load. The handoff (204) generally involves the firmware loading the first-stage boot loader (also known as a "boot block" or the "master boot record") from the boot device. At some point during or after this handoff (204), the virtualization software creates a RAM disk (206). In general, creating a RAM disk (206) involves allocating memory for the disk and creating block device interface that provides access to the RAM disk. In EFI, creating a RAM disk (206) may involve creating a device path representing the physical device, and installing the block device handle and block device protocols. The EFI boot services will connect the disk/filesystem protocols and make them available to the OS.

At this point, the OS loader begins to execute and load (208) the OS using the firmware data transfer interfaces. These interfaces include the block device interface created by the virtualization software. The interfaces provide access (210) to the RAM disk by servicing block I/O requests from the OS loader and/or OS itself. In an EFI implementation, these I/O requests are serviced using the block device handle and block device protocols provided to the OS loader by the virtualization software.

After the OS has performed some of boot-time actions, it may optionally transition (212) to using its own drivers rather than those provided by the firmware interface. The OS may utilize a block-device driver for a virtual block-device interface, the OS loader software can hand-off (214) to the OS driver the location of the RAM disk and provide the appropriate interface for accessing the RAM disk. The OS driver is compatible with the RAM disk as presented by the virtualization software, so the hand-off (214) may only include the memory location and size of the RAM disk. As far as RAM disk appears in the OS, it will have an object name (i.e., CDROM1, FLOPPY0, etc.) appropriate for a physical device, rather than having a specific object name and supporting code treating it as a RAMDISK device.

After the OS has completed loading, the OS can continue to access (216) devices it can see, either using its own add-on driver or using run-time interfaces of the firmware. In the latter case, the accesses may be serviced (218) by the firmware driver. In an EFI environment, this run-time access may be provided by EFI run-time services. In other arrangements, the add-on OS driver can access the RAM without the firmware services, which may provide better performance. A runt-ime firmware driver, if supported, would be more generic and may not necessarily require an OS driver.

Figure 3:
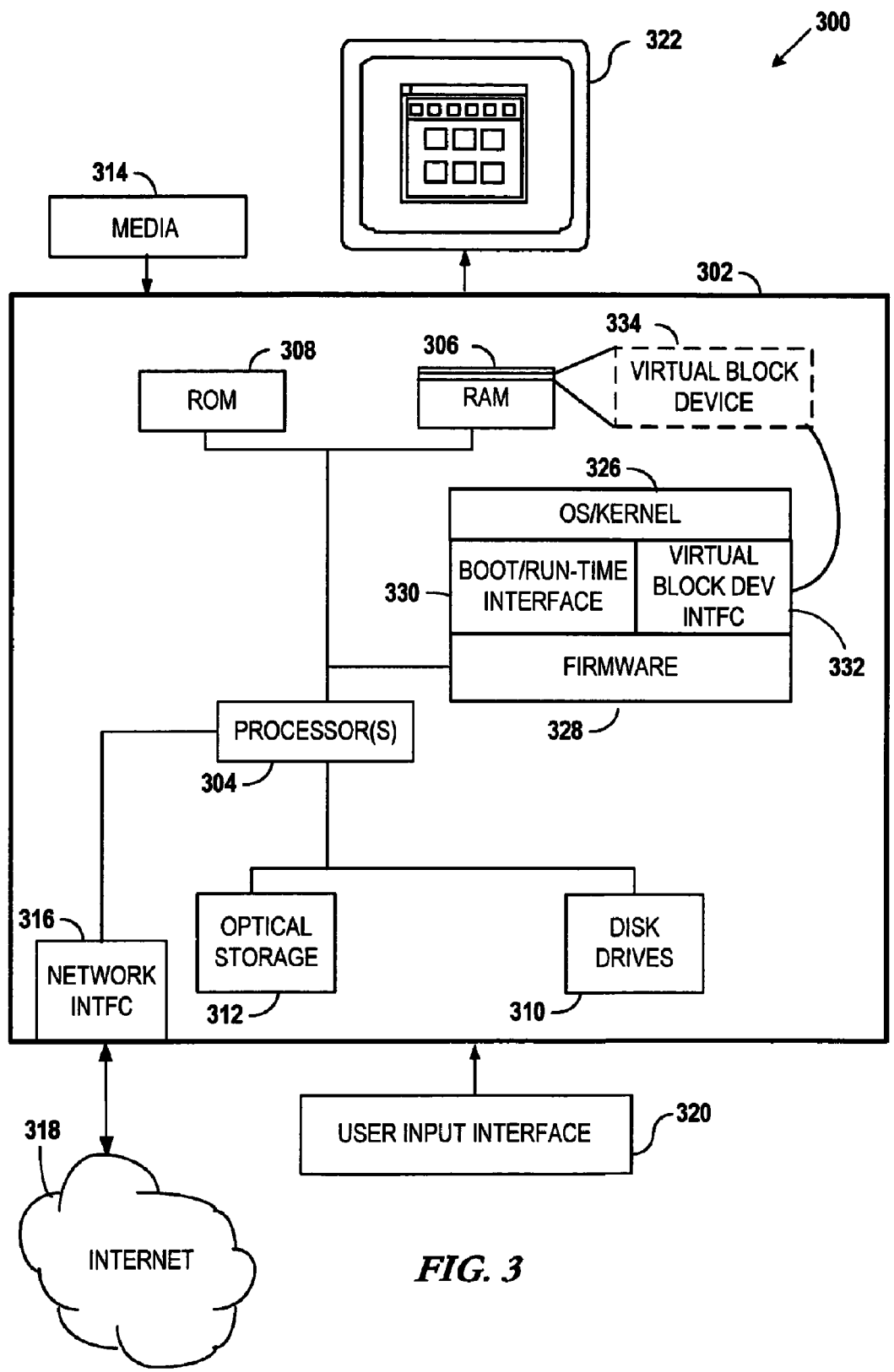
FIG. 3 illustrates a computing arrangement configured for providing a virtual block storage device according to embodiments of the present invention.

In reference now to FIG. 3, a computing arrangement 300 is shown for providing a RAM disk as a block device according to embodiments of the present invention. The computing arrangement 300 includes data processing hardware 302 that has one or more processors 304 coupled to various forms of memory. The processor(s) 304 are arranged to execute instructions stored on or provided by such memory. Memory accessible by the processor(s) may include random access memory (RAM) 306, read-only memory (ROM) 308, disk drives 310, optical storage 312 (e.g., CD-ROM, DVD), etc. The processor(s) 304 may also access data via memory available on removable media 314, such as floppy disks, Zip disks, flash memory, CD-ROM/R/RW, DVD, etc. The processor(s) 304 may also execute instructions received via a network interface 316. The network interface 316 may be data coupled to any data transfer network such as a local area network (LAN), wide area network (WAN) or global area network (GAN) such as the Internet 318.

The data processing hardware 302 may include and/or be coupled to a user input interface 320 and an output device 322 (e.g., a monitor) for interacting with users. The data processing hardware 302 includes software that may be provided in the form of instructions executable by the processor(s) 304. Generally, the software includes an OS 326 for the control and management of hardware 302 and basic system operations, as well as running applications. The OS 326 may include any type of kernel (e.g., monolithic kernel, microkernel, exokernel, etc.) and user interface software such as a shell and/or graphical user interface (GUI).

The OS 326 includes facilities for booting from system firmware 328 via a boot-time/run-time interface 330. The boot-time/run-time interface 330 may allow the OS 326 to access various components of the data processing hardware 302 during and/or subsequent to booting without utilizing OS RAM disk drivers. A virtual block device interface 332 is also accessible by the OS 326. The virtual block device interface 332 provides access to a virtual block device 334 that may be formed using a portion of RAM 306 or other solid-state memory. The virtual block device interface 332 represents itself to firmware by inserting itself as a device path in the firmware 328. The virtual block device interface 332 represents itself to OS 326 by inserting itself as an object name in the OS 326. The OS 326 may access the virtual block device 334 via the interface 332 during boot-time and/or during run-time of the OS 326. The virtual block device interface 332 may be accessed separately from the standard boot-time/run-time interface 330, or the virtual block device interface 332 may be incorporated as part of the boot-time/run-time interface 330.

It will be appreciated that the arrangement and composition of the hardware 302, firmware 328, and operating system 326 may differ from that described in relation to FIG. 3. It will be apparent to those skilled in the art that the descriptions provided herein of the virtual block device interface 332 and related software are independent of any particular configuration of the computing arrangement 300 or its operating environment.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

It will be appreciated that processor-based instructions for implementing embodiments of the invention are capable of being distributed in the form of a computer readable medium of instructions and a variety of other forms. The description herein of such processor-based instructions apply equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-based method of providing block data access for an operating system, comprising:
   allocating a portion of solid-state memory of a data processing arrangement for use as a block storage device;
   creating a block device interface that provides access to the portion of solid-state memory via firmware of the data processing arrangement, the block device interface emulating a certain removable electro-mechanical data-storage device accessible to the operating system;
   storing in the portion of the solid-state memory, software delivered on the certain removable electro-mechanical data-storage device;
   wherein the allocating, creating, and storing are performed prior to loading of the operating system;
   presenting the block device interface to a loader of the operating system;
   wherein the presenting includes providing a device path of the block device interface and handle of the block device to the loader of the operating system;
   beginning to load the operating system using the block device interface; and
   accessing the block device interface during boot time and during run-time by the operating system using the block device driver with the handle of the block device and the path of the block device interface.

2. The method of claim 1, wherein the solid-state memory comprises dynamic random access memory.

3. The method of claim 1, wherein the solid-state memory comprises flash memory.

4. The method of claim 1, wherein the solid-state memory comprises static random access memory.

5. The method of claim 1, wherein the electro-mechanical data-storage device comprises a hard disk.

6. The method of claim 1, wherein the electro-mechanical data-storage device comprises a floppy disk.

7. The method of claim 1, wherein the electro-mechanical data-storage device comprises an optical drive.

8. The method of claim 7, wherein the optical drive comprises at least one of a CD and a DVD.

9. The method of claim 1, wherein creating the block device interface via firmware of the data processing arrangement comprises creating the interface using an Extensible Firmware Interface (EFI) specification.

10. The method of claim 1, wherein accessing the block device interface comprises using the block device driver of the operating system during a run-time of the operating system.

11. A non-transitory computer-readable medium, comprising:
    a program storage device configured with instructions for causing a processor of a data processing arrangement to perform the operations of,
    allocating a portion of solid-state memory of the data processing arrangement for use as a block storage device;
    creating a block device interface that provides access to the portion of solid-state memory via firmware of the computing arrangement, the block device interface emulating a certain removable electro-mechanical data-storage device accessible to the operating system;
    storing in the portion of the solid-state memory, software delivered on the certain removable electro-mechanical data-storage device;
    wherein the allocating, creating, and storing are performed prior to loading of the operating system;
    presenting the block device interface to a loader of the operating system;
    wherein the presenting includes providing a device path of the block device interface and handle of the block device to the loader of the operating system;
    beginning to load the operating system using the block device interface; and
    accessing the block device interface during boot time and during run-time by the operating system using the block device driver with the handle of the block device and the path of the block device interface.

12. The non-transitory computer-readable medium of claim 11, wherein the solid-state memory comprises dynamic random access memory.

13. The non-transitory computer-readable medium of claim 11, wherein the solid-state memory comprises flash memory.

14. The non-transitory computer-readable medium of claim 11, wherein the solid-state memory comprises static random access memory.

15. The non-transitory computer-readable medium of claim 11, wherein the solid-state memory comprises programmable read only memory.

16. The non-transitory computer-readable medium of claim 11, wherein the block device interface comprises a removable media interface.

17. The non-transitory computer-readable medium of claim 11, wherein the electro-mechanical data-storage device comprises one of a hard disk, a floppy disk, and an optical drive.

18. The non-transitory computer-readable medium of claim 11, wherein creating the block device interface via firmware of the data processing arrangement comprises creating the interface using an Extensible Firmware Interface (EFI) specification.

19. The non-transitory computer-readable medium of claim 11, wherein accessing the block device interface comprises using the block device driver of the operating system during a run-time of the operating system.

20. An apparatus comprising:
    means for allocating a portion of solid-state memory of the apparatus for use as a block storage device;
    means for creating a block device interface that provides access to the portion of solid-state memory via firmware of the computing arrangement, the block device interface emulating a certain removable electro-mechanical data-storage device accessible to the operating system;
    means for storing in the portion of the solid-state memory, software delivered on the certain removable electro-mechanical data-storage device;

wherein the allocating, creating, and storing are performed prior to loading of the operating system;

means for presenting the block device interface to a loader of the operating system;

wherein the means for presenting includes means for providing a device path of the block device interface and handle of the block device to the loader of the operating system;

means for beginning to load the operating system using the block device interface; and means for accessing the block device interface during boot time and during run-time by the operating system using the block device driver with the handle of the block device and the path of the block device interface.

* * * * *